Oct. 8, 1963   R. S. KERTCHER   3,106,342
RADAR RANGE PREDICTOR
Filed April 26, 1961

INVENTOR.
ROBERT S. KERTCHER
BY
ATTORNEYS

United States Patent Office 3,106,342
Patented Oct. 8, 1963

3,106,342
RADAR RANGE PREDICTOR
Robert S. Kertcher, 3750 Birch St., Ventura, Calif.
Filed Apr. 26, 1961, Ser. No. 105,832
9 Claims. (Cl. 235—61)
(Granted under Title 35, U.S. Code (1952), sec. 266)

The invention described herein may be manufactured and used by or for the Government of the United States of America for governmental purposes without the payment of any royalties thereon or therefor.

The present invention relates to a radar range predictor and more particularly to a predictor for determining the range at which a radar can detect an object under specified conditions.

There has long existed a need for a calculator which will determine the predicted range of a particular radar for given conditions such as the type of object to be detected, the aspect of the object from the radar, the altitude of the object and the weather condition. Previously, a pilot, CIC director or a radar technician was in the dark concerning the performance of his radar since the performance varies considerably with these conditions. If the object is a large jet bomber which is showing its beam to a pilot's radar the pilot may well detect the bomber at a range of 36 nautical miles under clear weather conditions. However, taking another set of circumstances such as a pilotless aircraft showing its nose to the pilot's radar, the pilot will detect the pilotless aircraft at a range of something like 7 miles when the weather condition is a drizzle. A pilot having witnessed the first situation on one day may well believe his radar to be defective if the next day he witnesses the second situation. While the pilot may relate the conditions to the best of his knowledge to a radar technician, the technician can only speculate as to whether the conditions under which the radar is operating caused the reduced range or whether the radar itself is defective. In order to play it safe, the technician would probably run a complete check on the pilot's radar to ensure that it was operating properly. This results in an undue amount of time spent by pilots and radar technicians to check out their radars even though they are in good working order. Therefore a need has existed for a hand calculator which will determine for the pilot or technician the range at which a particular radar will detect an object having given certain conditions.

The present invention has satisfied this need by providing a card calculator which has the various conditions illustrated thereon and a resilient cursor which is moved with respect to the conditions so as to intersect a range reading corresponding to the given conditions. The various conditions are arranged on the card so that their correlation is easily made and the structure of the device enables a pilot to make a range determination by merely moving the resilient cursor with one finger. Accordingly, with such a device a pilot may make a determination while he is in the air as to whether or not has radar is operating properly. Under actual combat, the pilot may well determine the range at which he should pick up a particular target, and should he close below this range without picking up his target, he could peel off and return to his home base with the reasonable assurance that his radar is defective. It can readily be seen that the present invention will determine operational capability of a fighting unit and will assist in tactical problems immeasurably.

An object of the present invention is to provide a calculator which will predict the range at which a radar will pick up an object under given conditions.

Another object is to provide a device which is so simple to use that a pilot may make a determination of a predicted range of his radar while he is flying his aircraft.

Other objects and many of the attendant advantages of the invention will become readily apparent as the disclosure is made in the following detailed description of a preferred embodiment of the invention as illustrated in the accompanying sheet of drawings in which.

Figure 1:
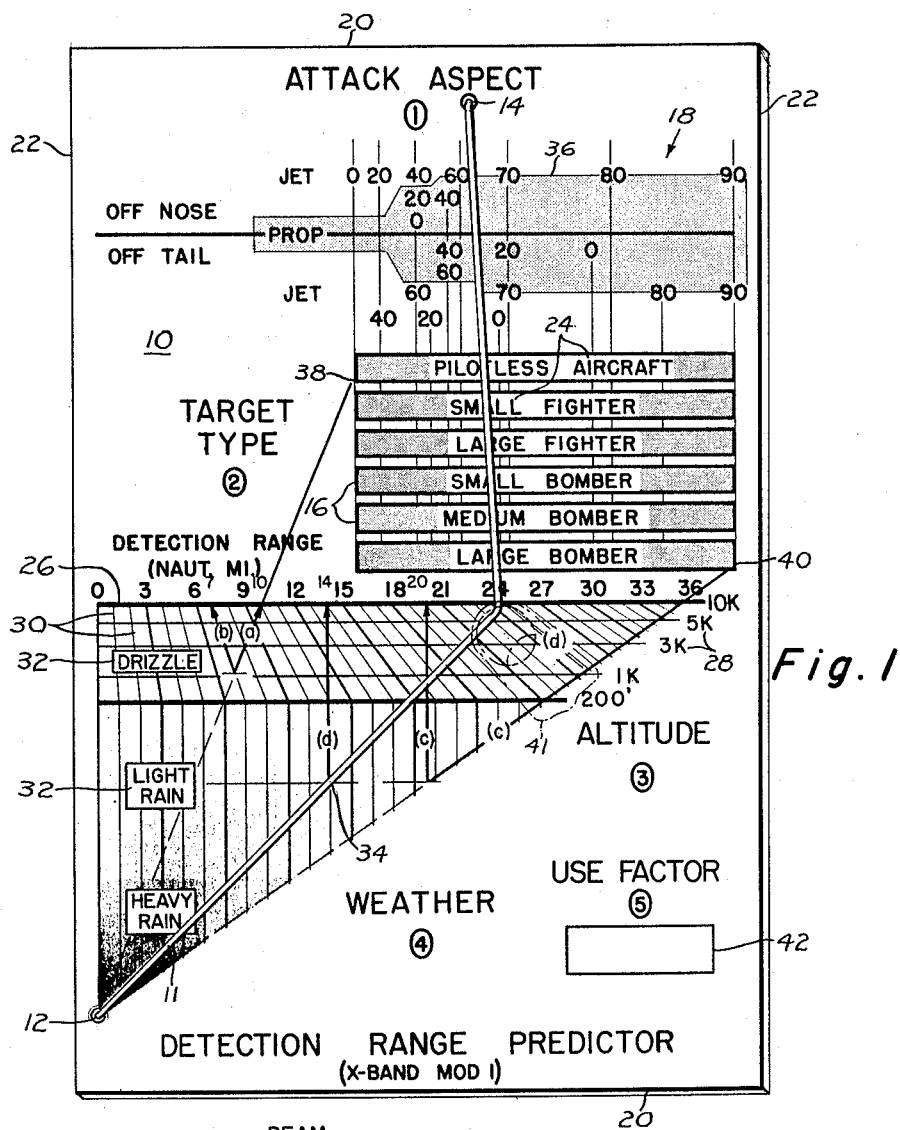
FIG. 1 shows a planned view of the predictor with four examples shown thereon.

Referring now to the drawings where like reference numerals designate like or corresponding parts throughout the several views, there is shown in FIG. 1 a card 10 having a resilient straight edged band 11 fixed at one end to a lower point 12 and at another end to an upper point 14. On the card is a set of indicia 16 representing types of targets in question and a set of indicia 18 representing various aspects of a target from a radar antenna. Each of the aforementioned indicia is aligned along a respective axis, all of the target type indicia 16 being aligned along a respective axis which is parallel to edges 20 of the card and each of the target aspect indicia 18 being aligned along a respective axis which is parallel to edges 22 of the card. Accordingly, the axis of each of the target aspect indicia 18 intersects the axis of each of the target type indicia 16 at various point locations 24, each of these point locations representing a particular target type at a particular aspect to the radar antenna. A line of indicia 26 on the card represents detection range of the radar under clear weather conditions. This line is arranged with respect to the aspect indicia 18 and the target type indicia 16 so as to correspond to the range intersected by the band 11 with the data represented by the point location also intersected by the band. A set of characters 28 are arranged on the base 10 to represent altitudes lower than 10,000 feet, each of these characters representing a particular altitude level therebelow. Each of the altitude characters 28 is aligned along a respective axis which is spaced from the range indicia line 26 and which intersects the band 11 through its normal range of movement. The axes of the altitude characters 28 are correlated with the range indicia line 26 by factor lines 30, these factor lines directing an operator's reading to an indicium on the range indicia line from the intersection of an appropriate character axis 28 with the band 11. Accordingly, the range indicium intersected by any factor line equals the range indicium intersected by the band as changed by the altitude represented by the altitude character axis intersected by the band. An additional set of characters 32 are located on the card to represent weather conditions more inclement than clear weather, each weather character having an alignment characteristic along a respective axis which is parallel to the edges 20 of the card and along a respective axis which is parallel to the edges 22 of the card. Each weather character axis intersects the band through its normal range of movement and when the band is in any one position such as that illustrated on the card, it will intersect each weather character axis at a respective common point such as at common point 34 for a light rain weather condition. Every common point is aligned with an indicium on the range indicia line 26 by edges 22 of the card, the common point 34 being aligned on a range of 14 miles. Accordingly, the range indicium aligned upon from the common point will be equal to the range condition intersected by the band 11 as changed by the weather condition under consideration.

Figure 2:
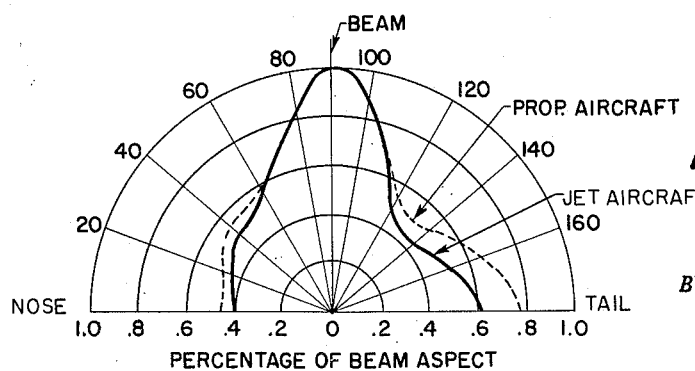
FIG. 2 is a chart showing the decrease in radar response from a beam target depending upon the type of target and the aspect of the target from the radar.

The aspect indicia 18 are divided into jet indicia and prop indicia by a dividing line 36, the aspect indicia intersected by the dividing line 36 being a common value for both jet and prop type of aircraft. The data represented by the aspect indicia 18 is best understood by reference to FIG. 2 where ratios of a beam target range are scaled for various types of aircraft and aspects other than beam. It can be seen from FIG. 2 that for aspects of the targets which are beam and aspects close thereto the ratios of the beam target range are substantially identical whether the target be a jet or a prop aircraft. It is to be noted that the ratio of a tail aspect is greater than that of a nose aspect since under low closing rates the target will remain for several traces in the same position on the viewing scope giving a greater range detection. The data shown in FIG. 2 has been placed on the card to be operable with the band for locating predicted range for various types of aircraft. The target type indicia 24 is progressively arranged on the card from the smallest type, namely pilotless aircraft, to the largest type, namely the large bomber.

In the operation of the predictor four examples, (a) through (d), are given, which examples are illustrated on the card in FIG. 1. In all of the examples the following is known: the attack aspect of the target, the target type, the altitude of the target and the weather conditions. The problem is to find a predicted range of a particular radar having known these conditions.

*Example a*

Problem.—In clear weather find detection range for head-on attack against a pilotless aircraft (jet) at a 10,000 foot altitude or higher.

Solution.—Place the band 11 along line (a) in FIG. 1 so as to intersect a point location 38 representing a jet type pilotless aircraft at a 0° aspect and read the detection range intersected by the band on the range indicia line, which range equals 10 nautical miles.

*Example b*

Problem.—The same as Example a except the aircraft is at an altitude of 1,000 feet.

Solution.—The position of the band is the same as in Example a, the reading being dropped to the 1,000 foot axis along the band and then followed along the factor line (b) to the range indicia line, giving an answer of 7 nautical miles.

*Example c*

Problem.—Under a light rain weather condition find detection range for beam attack against a large bomber (jet) at an altitude of 10,000 feet or higher.

Solution.—Place the band 11 at a point location 40 representing a large bomber at a 90° aspect. Follow the band down line (c) to the character representing a light rain condition and then read straight up line (c) to the range indicia line giving a predicted range of 20 miles.

*Example d*

Problem.—The same problem as Example c except the aircraft is at a 1,000 foot altitude.

Solution.—First place the band as done in Example c and follow it down to the 1,000 foot level and then read up the factor line along line (d) to the range indicia line giving a value of 24 nautical miles. Then move the band to intersect the 24 miles range indicium as shown in the drawing and follow the member down to a light rain condition and then read straight up line (d) to the range indicia line to give a value of 14 nautical miles. The band is shown in position for this example, being held in place by a finger 41.

The predictor as described herein is made up for a particular radar, however, it has application to any other type of radar in that the value read thereon can be multiplied by a use factor so as to convert it to a proper reading for the radar under consideration. A use factor square 42 is provided on the card for insertion of a ratio for these conversions. While the band has been described as being resilient, the device would work with a non-resilient straight-edged member rotatably mounted about the fixed point 12, this member being free at its other end. However, for use by a pilot while he is flying his aircraft the resilient band fixed at both points 12 and 14, allows the pilot to make the predicted range determination with one of his fingers by moving the straight-edge member to the proper position, the card being kept in place by a strap attached to the leg of the pilot. While the conditions described are applicable primarily to radar range detection the predictor has application to other unknowns such as predicting weather from various known conditions.

It is now readily apparent that the present invention provides a simple device which is compact and easy to operate. It brings together upon one card a variety of four different types of data which can be correlated easily by the eye and a resilient band to give the sought-for information.

Obviously many modifications and variations of the present invention are possible in the light of the above teachings. It is, therefore, to be understood that within the scope of the appended claims, the invention may be practiced otherwise than as specifically described.

I claim:

1. A calculator for determining a value corresponding to at least a first and second given condition comprising a base, a resilient straight-edged band having ends, each end being rotatable about a respective fixed point on said base, indicia on the base representing a set of first conditions, at least one indicium on the base representing a second condition, each of all of the indcia having an alignment characteristic along a respective axis, the first condition indicia aligned with their axes intersecting the axis of the second condition indicium at particular point locations therealong, each point location representing a combination of the first and second conditions, additional indicia on the base representing values corresponding to given conditions, said additional indicia arranged so that when the band is extended between the fixed points and one of said point locations it will intersect one of said additional indicia at a value corresponding to the given conditions of the latter point location whereby a determination of a value corresponding to at least two given conditions can be read by a single positioning of the band over the point location corresponding to the given conditions.

2. A calculator for determining a value corresponding to at least a first and second given condition comprising a base, a resilient straight-edged band having ends, each end being rotatable about a respective fixed point on said base, indicia on the base representing a set of first conditions, at least one indicium on the base representing a second condition, means for aligning each of all of the aforementioned indica along a respective axis, the first condition indicia aligned with their axes intersecting the axis of the second condition indicium at particular point locations therealong, each point location representing a combination of the first and second conditions, additional indicia on the base representing values corresponding to given conditions, said additional indicia arranged so that when the band is extended between the fixed points and one of said point locations it will intersect one of said additional indicia at a value corresponding to the given conditions of the latter point location whereby a determination of a value corresponding to at least two given conditions can be read by a single positioning of the band over the point location corresponding to the given conditions.

3. A calculator as claimed in claim 2 wherein a set of characters are on the base representing conditions affecting the magnitude of the values corresponding to the combinations of first and second given conditions, a line from each character spaced from the additional indicia and intersecting the band through its normal range of movement, factor lines intersecting the character lines and the additional indicia, the indicium of the additional indicia intersected by any factor line intersecting the band equaling the indicium of the additional indicia intersected by the band as modified by the condition represented by the character line intersected by the band and the latter factor line.

4. A calculator as claimed in claim 2 wherein a set of characters are on the base representing conditions affecting the magnitude of the values corresponding to the combinations of first and second given conditions, said means for aligning also aligning each character along a respective axis, each character axis spaced from the additional indicia and intersecting the band through its normal range of movement, factor lines intersecting the character axes and the additional indicia, the indicium of the additional indicia intersected by any factor line intersecting the band equaling the indicium of the additional indicia intersected by the band as modified by the condition represented by the character axis intersected by the band and the latter factor line.

5. A calculator as claimed in claim 4 wherein a set of additional characters are on the base representing conditions further affecting the magnitude of the values corresponding to the combinations of first and second given conditions, each additional character having an aligning characteristic along a first and second axes normal to one another, the first axis of each additional character intersecting the band during its normal movement, the second axis of each additional character aligning the intersection of the first axis and the band with an indicium of the additional indicia, any indicium so aligned equaling the indicium of the additional indicia intersected by the band as modfied by the condition represented by the first additional character axis intersecting the band.

6. A calculator as claimed in claim 4 wherein a set of additional characters are on the base representing conditions further affecting the magnitude of the values corresponding to combinations of the first and second given conditions, said means for aligning also aligning each of the additional characters along a respective axis, each of these axes spaced from the additional indicia and intersecting the band during its normal range of movement, said means for aligning also aligning along a further axis intersections of the additional character axes and the band with an indicium of the additional indicia, any indicium so aligned equaling an indicium of the additional indicia intersected by the band as modified by the condition represented by the additional character axis intersecting the band and a corresponding further axis.

7. A range predictor for radar comprising a base, a straight-edged resilient band having ends, each end being rotatable about a fixed point on said base, a set of indicia on the base representing types of targets, another set of indicia on the base representing aspect of the target from the radar, means for aligning each of all the aforementioned indicia along a respective axis, the axes of the target indicia intersecting the axes of the aspect indicia at a plurality of point locations, each point location representing a particular target at a specified aspect from the radar, additional indicia on the base representing predicted range for the radar at a given altitude and weather condition, said range indicia arranged on the base so that when the straight-edged band is extended between the fixed points and one of the point locations the band will intersect one of the range indicia at a range corresponding to the target and aspect of the latter point location whereby determination of a value corresponding to a given target and aspect can be read off by a pilot using one finger to position the band over the latter point location.

8. A range predictor as claimed in claim 7 wherein all of the indicia is arranged on the base between the two fixed points and the target type indicia is arranged between the aspect indicia and the range indicia.

9. A range predictor for a particular radar comprising a base, a straight-edged resilient band extending between and rotatable about each of two fixed points on said base, a set of indicia on the base representing types of targets, another set of indicia on the base representing aspects of the target from the radar, means for aligning each of all the aforementioned indicia along a respective axis, the axes of the target indicia intersecting the axes of the aspect indicia at a plurality of point locations, each point location representing a particular type of target at a specified aspect from the radar, additional indicia on the base representing predicted range for the radar at and above a particular altitude under clear weather conditions, all of the indicia being arranged on the card between the two fixed points, the target-type indicia arranged between the aspect indicia and the range indicia, said range indicia further arranged on the base so that when the band is extended to intersect one of the point locations the band will also intersect one of the range indicia at a range corresponding to the target type and aspect represented by the latter point location, a set of characters on the card representing altitudes below said particular altitude, each altitude character aligned along a respective axis which is spaced from the range indicia and which intersects the band through its normal range of movement, factor lines intersecting the character axes and the range indicia, the range indicium intersected by any factor line equaling the range indicium intersected by the band as modified by the altitude represented by the character axis intersected by the band and the latter factor line, an additional set of characters on the base representing weather conditions more inclement than clear weather, each weather character aligned along a respective axis, each of the weather character axes intersecting the band through its normal range of movement, the band in any one position intersecting each weather character axes at a respective common point, said aligning means also aligning along a further axis any common point with a range indicium, each range indicium intersected by one of the further axes from a particular common point equaling the range indicium intersected by the band when passing through the particular common point as modified by the weather condition represented by the character axis at the common point whereby predicted range corresponding to a type of target, aspect of the target from the radar, altitude and weather condition can be easily determined.

References Cited in the file of this patent
UNITED STATES PATENTS

| | | |
|---|---|---|
| 1,552,113 | Clarke | Sept. 1, 1925 |
| 2,076,439 | Young | Apr. 6, 1937 |
| 2,557,965 | Hilsenrath et al. | June 26, 1951 |